No. 826,589. PATENTED JULY 24, 1906.
M. MEIROWSKY.
ELECTRICAL INSULATOR.
APPLICATION FILED JAN. 31, 1905.

2 SHEETS—SHEET 1.

Attest:
A. N. Jesbera
M. A. Brayley

Inventor:
Max Meirowsky
by Redding Kiddle & Greeley
Attys.

No. 826,589. PATENTED JULY 24, 1906.
M. MEIROWSKY.
ELECTRICAL INSULATOR.
APPLICATION FILED JAN. 31, 1905.
2 SHEETS—SHEET 2.
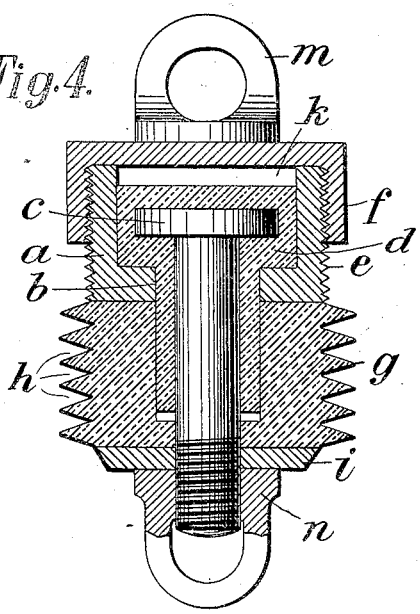
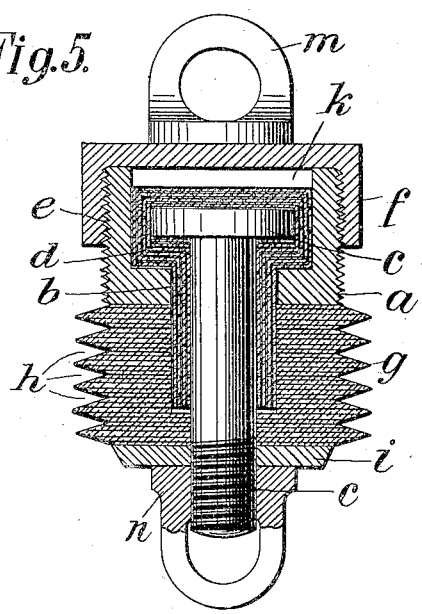

UNITED STATES PATENT OFFICE.

MAX MEIROWSKY, OF COLOGNE-EHRENFELD, GERMANY.

ELECTRICAL INSULATOR.

No. 826,589.　　　Specification of Letters Patent.　　Patented July 24, 1906.

Application filed January 31, 1905. Serial No. 243,457.

*To all whom it may concern:*

Be it known that I, MAX MEIROWSKY, a subject of the King of Prussia, German Emperor, and a resident of Cologne-Ehrenfeld, Germany, have invented certain new and useful Improvements in Electrical Insulators, of which the following is a specification.

The present invention relates to an insulator for the trolley-wires of electric tramways for high-potential conductors, switches, implements, tools, and the like, laminated insulation, particularly mica, being preferably employed.

The utilization of laminated insulation, especially of mica, which has such excellent insulating qualities, hitherto offered great difficulties in the case of conductors in the open. These difficulties are overcome in the case of the present insulator, in the first place by the laminated insulation being surrounded by a cap, preventing the loosening and coming apart of the laminations, or by mica rings, and, in the second place, by both the metal parts and also the parts of the insulation being so arranged and formed that the non-uniform forces which come into action, particularly in the case of trolley-wires, exercise no injurious effect on the parts of the insulation, and these parts in case of need can be easily separately exchanged. Moreover, care has been taken to provide as large an insulation-surface as possible in order to prevent leakage-currents.

The invention is illustrated in the accompanying drawings, in which—

Figure 1:
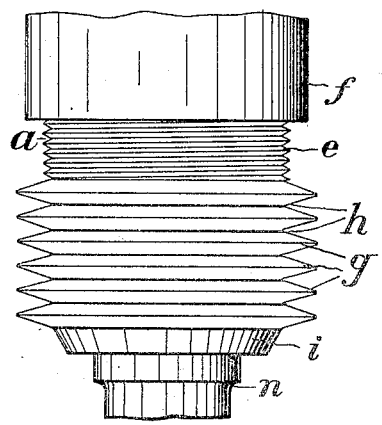
Figure 2:
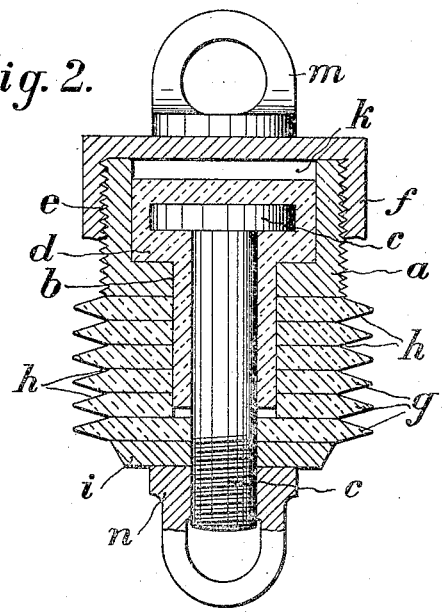
Figure 3:
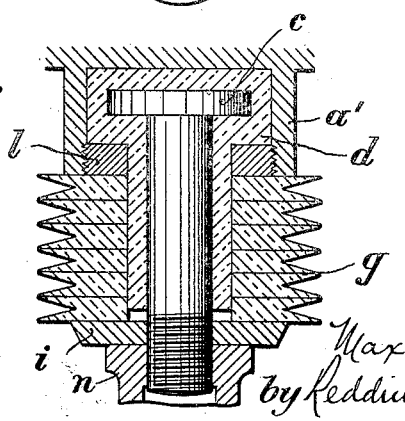

Figure 1 is an elevation of an insulator according to the present invention; Fig. 2, a cross-section of the insulator shown in Fig. 1 partly modified; Fig. 3, a cross-section of a modified form of insulator; Fig. 4, a cross-section showing another modified form of insulator, and Fig. 5 a cross-section showing the insulation of mica laminated.

In the case of the form represented in Fig. 1 the one metal part of the insulator to be insulated possesses the form of a cap $a$, which is provided with an opening $b$ in its bottom. The interior of the cap $a$ receives the one end of the other metal part $c$ to be insulated, which is surrounded with the mass of insulating material $d$, and the bolt or shank portion of said part passes through the central opening in the bottom of the cap $a$, so that the bottom of the cap $a$ forms a strong counter-support for the part $c$. Moreover, the cap prevents the lamination of the insulating mass $d$ from opening out and becoming loose. The cap $a$ has an external screw-thread $e$, and upon this screw-thread a second cap $f$ with an internal thread is screwed. A number of mica rings $g$ are placed on the insulating material of the part $c$, said rings forming furrows $h$ on their circumference, whereby an air path or surface which is as great as possible is obtained between the metal parts, and the formation of a conducting-bridge is prevented. The mica rings are connected together by means of a binding medium—for instance, an adhesive oil, resin, or the like—which also serves at the same time for filling up possible empty spaces. Even in the case of water trickling down the insulator moisture which penetrates into the same cannot reach the metal part $c$ in consequence of the insulation $d$. The insulation is still more materially increased by the shaft of the part $c$ itself being surrounded by axially-arranged leaves of mica pressed against said part, while the mica rings $g$ are placed on radially. The mica rings $g$ are pressed firmly together and against the bottom of the cap $a$ by a nut $i$ screwed upon the part $c$. By means of this pressure, in the first place, the penetration between the mica rings of moisture and of parts injurious to the insulation is prevented, and the further advantage is obtained that non-uniform pressure—such as, for example, is present in the case of trolley-wires—exercises no injurious effects on the parts of the bolt supported against the cap $a$. In the interior of the cap $a$ the insulation $d$ and the air-space $k$, situated above it, reliably prevent the transmission of current.

When the thread of the caps $a$ $f$ are a suitable length, the present insulator can also be used as a tension or wire-tightening device. The internally-screwed part $f$ may be provided with an eye $m$, as shown in Fig. 2, or another suitable device for the attachment of a wire or the like. It is to be understood, however, that the part $f$ varies with the uses of the insulator.

In the case of the embodiment shown, by way of example, in Fig. 3 the cap $a'$ is closed on one side. A sufficient amount of laminated insulating material is pressed into this cap $a'$ and surrounds the end of the metal part $c$, which is covered on its shaft with insulating material $d$, said end being introduced into the cap. The insulating material in the cap $a'$ is pressed down by a screw-ring $l$, and, if desired, is thereby molded into its final form. The two metal parts $a'$ and $l$ are thereby connected firmly together and completely surround the head of the other metal part $c$. The grooved mica rings surrounding the insulated bolt $c$, which rings render the transmission of current impossible even in the case of rain, snow, dirt, and dust, can also be employed in the case of the present embodiment. By giving suitable dimensions to the insulating parts any desired insulating resistance can be obtained.

In consequence of the greater insulating capacity of the present insulator the parts may be considerably smaller than hitherto, whereby a saving in material is effected, and in the case of insulating trolley-wires and the like a better appearance is produced.

Although, as above stated, laminated insulating materials, in particular mica, is intended to be principally employed; yet the described devices can, if desired, also be used for plastic insulating material.

Instead of the rings $g$ of mica rings of other insulating material can be employed, if desired, or an undivided case can be placed on the insulation of the bolt $c$ and be pressed by the nut $i$ against the bottom of the cap $a'$, as shown in Fig. 4. In suitable cases the rings $g$ or the like may be also omitted.

What I claim as my invention, and desire to secure by Letters Patent, is—

1. The combination of a metal cap having an opening at its end, a metal member lying partly in said metal cap, and partly projecting through the opening in the cap, insulating material surroundng said metal member and partly surrounded by the metal cap, insulation surrounding the above-mentioned insulating material surrounding the portion of the metal member projecting through the opening in the cap, and means clamping the above-mentioned insulation against the end of the metal cap, substantially as described.

2. The combination of a metal cap, having an opening at its end, a metal member lying partly in said metal cap and partly projecting through the opening in the cap and having a screw-thread on the latter projecting portion, insulating material surrounding said metal member and partly surrounded by the metal cap, insulation surrounding the above-mentioned insulating material surrounding the portion of the metal member projecting through the opening in the cap, and a nut on the screw-thread of the said metal member pressing the above-mentioned insulation against the ends of the metal cap, substantially as described.

3. The combination of a metal cap, having an opening at its end, a metal member lying partly in said metal cap and partly projecting through the opening in the cap and having a screw-thread on the latter projecting portion, laminated insulating material surrounding said metal member and partly surrounded by the metal cap, insulation surrounding the above-mentioned insulating material surrounding the portion of the metal member projecting through the opening in the cap, and a nut on the screw-thread of the said metal member pressing the above-mentioned insulation against the ends of the metal cap, substantially as described.

4. The combination of a metal cap having an opening at both ends and having a screw-threaded portion, an adjustable screw-cap engaging with said screw-threaded portion and closing the metal cap at one end, a metal member lying partly in said metal cap and partly projecting through the opening in the cap and having a screw-thread on the latter projecting portion, insulating material surrounding said metal member and partly surrounded by the metal cap, insulation surrounding the above-mentioned insulating material surrounding the portion of the metal member projecting through the opening in the cap, and a nut on the screw-thread of the said metal member pressing the above-mentioned insulation against the ends of the metal cap, substantially as described.

5. The combination of a metal cap having an opening at its end, a metal member having a head portion and a shank portion, the head portion lying in said metal cap and the shank portion projecting through the opening in the cap and having a screw-thread, insulating material surrounding said metal member and partly surrounded by the metal cap, insulation surrounding the above-mentioned insulating material surrounding the projecting shank portion of the metal member, and a nut on the screw-thread of said shank pressing the above-mentioned insulation against the end of the metal cap, substantially as described.

6. The combination of a metal cap having an opening at its end, a metal member lying partly in said metal cap, and partly projecting through the opening in the cap, insulating material surrounding said metal member and partly surrounded by the metal cap, insulation consisting of rings having furrows in their circumferences surrounding the above-mentioned insulating material surrounding the portion of the metal member projecting through the opening in the cap, and means clamping the above-mentioned rings against the end of the metal cap, substantially as described.

7. The combination of a metal cap having an opening at its end, a metal member lying partly in said metal cap, and partly projecting through the opening in the cap, insulating material surrounding said metal member and partly surrounded by the metal cap, insulation consisting of mica rings having furrows in their circumferences surrounding the above-mentioned insulating material surrounding the portion of the metal member projecting through the opening in the cap, and means clamping the above-mentioned mica rings against the end of the metal cap, substantially as described.

8. The combination of a metal cap having an opening at its end, a metal member having a head portion and a shank portion, the head portion lying in said metal cap and the shank portion projecting through the opening in the cap and having a screw-thread, insulating material surrounding said metal member and partly surrounded by the metal cap, insulation consisting of mica rings having furrows in their circumferences surrounding the above-mentioned insulating material surrounding the projecting shank portion of the metal member, and a nut on the screw-thread of said shank pressing the above-mentioned mica rings against the end of the metal cap, substantially as described.

9. The combination of a metal cap having an opening at its end, a metal member lying partly in said metal cap, and partly projecting through the opening in the cap, insulating material in the form of axially-arranged laminations surrounding said metal member and partly surrounded by the metal cap, insulation surrounding the above-mentioned insulating material surrounding the portion of the metal member projecting through the opening in the cap, and means clamping the above-mentioned insulation against the end of the metal cap, substantially as described.

10. The combination of a metal cap having an opening at its end, a metal member lying partly in said metal cap, and partly projecting through the opening in the cap, insulating material in the form of axially-arranged laminations surrounding said metal number and partly surrounded by the metal cap, insulation consisting of radially-arranged rings surrounding the above-mentioned insulating material surrounding the portion of the metal member projecting through the opening in the cap, and means clamping the above-mentioned rings against the end of the metal cap, substantially as described.

11. The combination of a metal cap having an opening at its end, a metal member having a head portion and a shank portion, the head portion lying in said metal cap and the shank portion projecting through the opening in the cap and having a screw-thread, insulating material in the form of axially-arranged laminations of mica surrounding said metal member and partly surrounded by the metal cap, insulation consisting of radially-arranged mica rings surrounding the above-mentioned insulating material surrounding the projecting shank portion of the metal member, and a nut on the scew-thread of said shank pressing the above-mentioned rings against the end of the metal cap, substantially as described.

In witness whereof I have hereunto signed my name in the presence of two subscribing witnesses.

MAX MEIROWSKY.

Witnesses:
WILLIAM KUEPPERS,
JOH. SCHOLEZ.